H. R. STUART.
ELECTRIC GENERATOR AND MOTOR.
APPLICATION FILED APR. 22, 1914.

1,238,213.

Patented Aug. 28, 1917.
3 SHEETS—SHEET 1.

H. R. STUART.
ELECTRIC GENERATOR AND MOTOR.
APPLICATION FILED APR. 22, 1914.

1,238,213.

Patented Aug. 28, 1917.
3 SHEETS—SHEET 2.

UNITED STATES PATENT OFFICE.

HARVE R. STUART, OF SPRINGFIELD, OHIO, ASSIGNOR TO THE ROBBINS & MYERS COMPANY, OF SPRINGFIELD, OHIO, A CORPORATION OF OHIO.

ELECTRIC GENERATOR AND MOTOR.

1,238,213.  Specification of Letters Patent.  Patented Aug. 28, 1917.

Application filed April 22, 1914. Serial No. 833,624.

*To all whom it may concern:*

Be it known that I, HARVE R. STUART, a citizen of the United States, residing at Springfield, in the county of Clark and State of Ohio, have invented certain new and useful Improvements in Electric Generators and Motors, of which the following is a specification.

This invention has for its object the production of an electric generator or motor in which the magnetic lines of the field magnets are increased in the outside portions of the pole pieces and decreased in the central portion of the pole pieces so as to hold the magnetic center stationary or uniform and preventing the shifting of the axis of commutation; the invention being particularly adapted for use with differential compound wound generators and for variable speed shunt wound motors.

The invention consists in the combination and construction of parts hereinafter described and set forth in the claims.

In the accompanying drawings:—

Like parts are represented by similar letters in the several views.

Figure 1:
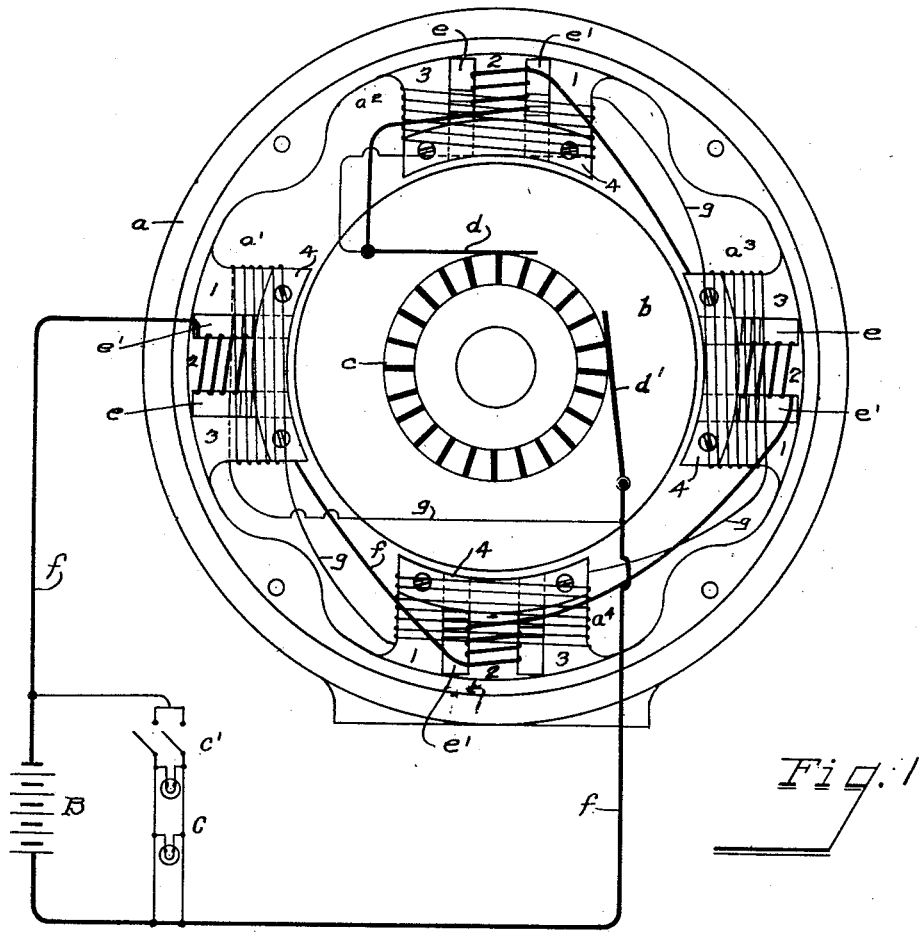
Figure 1 is an elevation somewhat in the nature of a diagram view embodying my invention.
Figure 3:
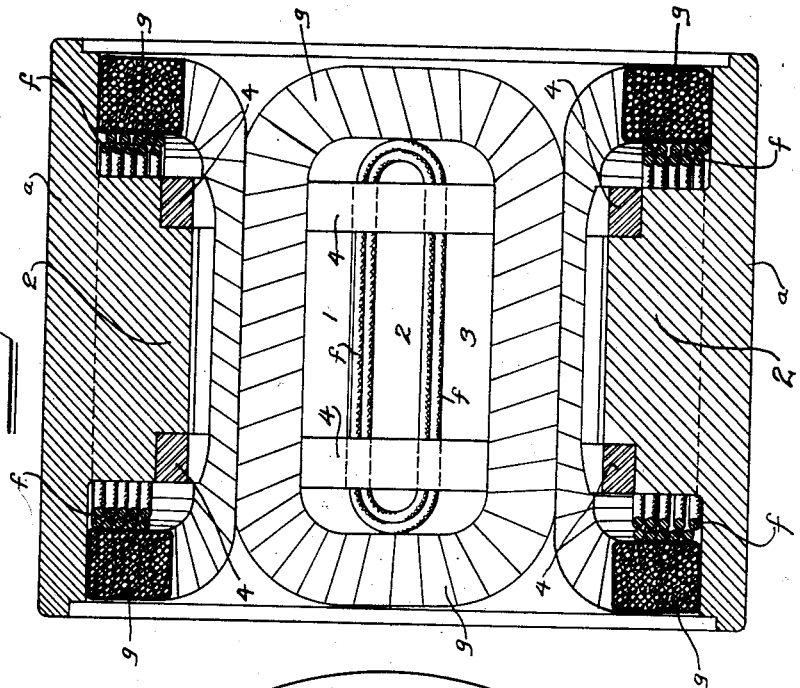
Figs. 2 and 3 are end and sectional elevations of the field magnets and windings thereof.
Figure 2:
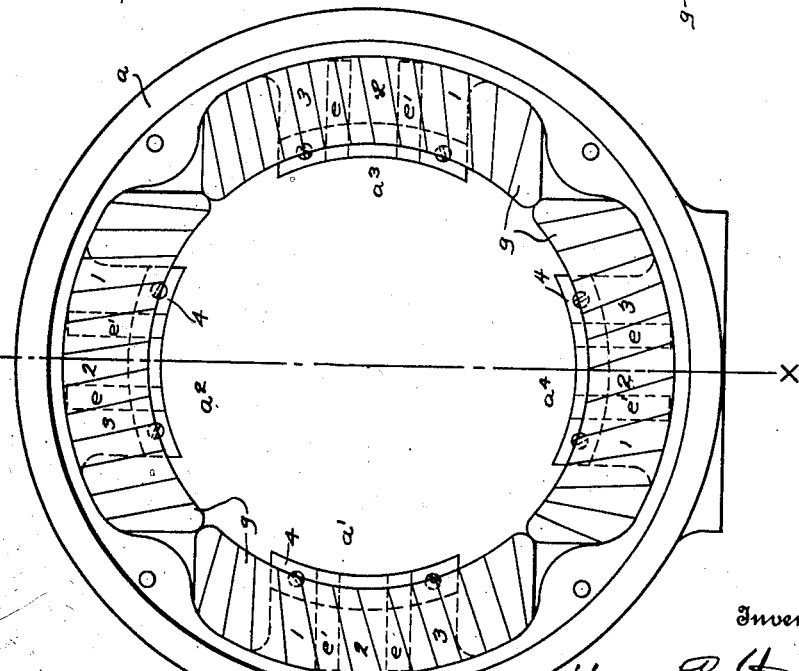

In the said drawings, $a$ represents the frame of a generator or motor, $b$ the armature, $c$ the commutator, and $d$ and $d'$ the brushes. In the frame $a$ there are shown four field magnets $a^1$, $a^2$, $a^3$ and $a^4$ and the pole pieces of each of these magnets are preferably divided into three parts by means of longitudinal grooves $e$ and $e'$, which pass through the pole pieces in planes parallel to the axis of the armature. Each of the pole pieces is thus divided into three parts, 1, 2 and 3 and these parts are magnetically connected by means of bars or shoes 4 which extend across the grooves and are removably secured to each of the parts 1, 2 and 3 in the pole pieces preferably by notching the bars or shoes into the ends of the pole pieces as shown in Fig. 3. By having these bars or shoes removable the coil may be first fitted and slipped into place on the magnets, thus facilitating the assemblage or repairs of the parts. These bars or shoes 4 are preferably so connected to the other portions that their inner surface or that side next to the armature shall be flush with the ends of the pole pieces and shaped to conform to the curvature of the armature. When employed in a generator, as shown in Fig. 1, the field magnets are wound with a series winding indicated by heavy black lines $f$ in this drawing which lies within the grooves $e$ and $e'$ and surrounds the central portion 2 of each of the pole pieces, while a shunt winding indicated by a finer line $g$ is supplied to each of the magnets and passes entirely around the outside of the pole pieces, and particularly the outer portions 1 and 3 of said pole pieces. In this figure I have indicated the generator as used for charging a battery B with a translating circuit C to which power may be supplied either from the battery or generator by the opening and closing of the switch C'.

Figure 4:
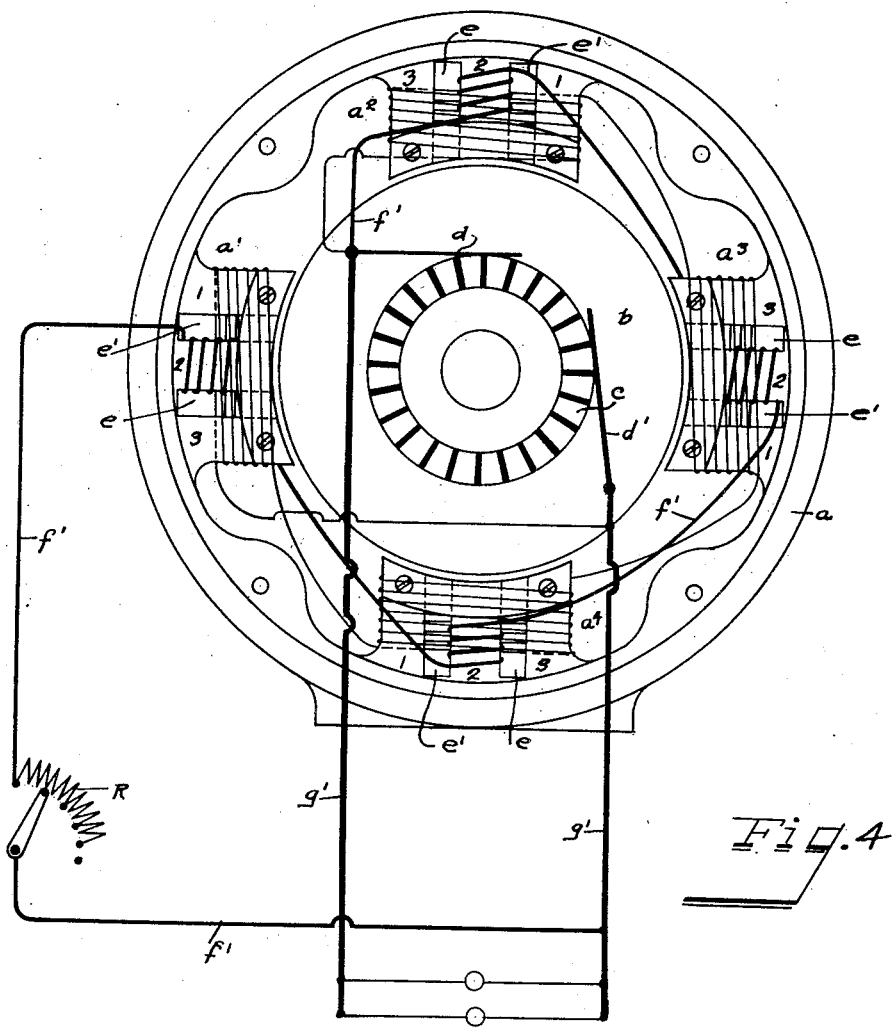
Fig. 4 is an elevation somewhat in the nature of a diagram showing an arrangement of the invention particularly adapted for variable speed motors.

In Fig. 4 the invention is shown as more especially adapted for variable speed motors in which two shunt windings are shown, the inner winding around the inner pole piece being shown in heavy lines $f'$ and being opposite to the outer winding as shown in the light lines $g'$. In the diagram is also shown a rheostat R by which the resistance in the inner or heavy line winding can be varied or this circuit cut out entirely.

In either case the winding on the inner or central portions of the pole pieces is opposed to the winding on the outside of the pole pieces. It will be seen from the drawings and this description that when this arrangement of the divided poles and opposing windings is employed that the opposing force of one of the windings tends to counteract the force of the other. This results in the decrease of the magnetic lines passing from the frame of the machine through said pole pieces and into the armature core at the same time it increases the number of magnetic lines in the outside portions of the pole pieces and decreases them in the central portion in such a way as to hold the magnetic center of the pole stationary or uniform; since the increase in the current in the central portion sets up a flux from the outer portions of the pole to the inner and thus keeps the outer portions of the pole pieces saturated, and therefore prevents the axis of commutation from shifting. This result will be obtained whether the fields are compound wound with windings in series and in shunt, preferably used in generators, as shown in Fig. 1, or are provided with opposed shunt windings, preferably used in variable speed motors, as shown in Fig. 4. When the arrangement shown in Fig. 4 is employed if the opposed or central winding is cut out the motor will operate as an ordinary shunt motor and by connecting such winding in circuit and decreasing the resistance therein more or less current will be passed through such winding and thus the speed of the motor will be varied due to the fact that the magnetic lines passing through the armature are varied while the magnetic lines in the outer portions of the pole pieces themselves will remain substantially constant and keep the outer edges of the pole pieces saturated so as to prevent the shifting of the axis of commutation.

Having thus described my invention, I claim:

1. In a motor or generator, field magnets having pole pieces divided into separated parts and provided with windings arranged tangentially to the armature, one of which windings passes entirely around the pole pieces, the interior winding being arranged parallel with the outer winding, a plurality of shoes connecting the different parts of the pole pieces, one shoe being located at one side of the pole and the other at the opposite side, the said shoes extending across the parts of the pole pieces and being located within the outer winding, substantially as specified.

2. In a motor or generator, field magnets having pole pieces divided into parts with grooves or openings between the parts, circuit windings passing entirely around the parts of the pole pieces, and circuit windings around the center part and within the outer windings, both of said circuit windings being arranged substantially tangentially to the armature of the motor, a plurality of shoes for each pole piece separated one from the other and extending across the grooves and located within the outer windings, substantially as specified.

3. In a motor or generator, field magnets having pole pieces divided into separated parts with grooves between the parts, circuit windings extending around the pole piece, and circuit windings extending around the center part of the pole piece, said windings being in parallel relation and arranged tangentially to the armature, notches formed in the ends of the parts of the pole pieces, and a plurality of shoes for each pole piece extending within said notches and inclosed by the first mentioned windings for the purpose specified.

In testimony whereof, I have hereunto set my hand this 16th day of April, 1914.

HARVE R. STUART.

Witnesses:
CHAS. I. WELCH,
ESTHER E. PFEIFER.